United States Patent
Saleh

(10) Patent No.: US 6,654,458 B1
(45) Date of Patent: Nov. 25, 2003

(54) ADMINISTRATION AND CONTROL OF AN AUTOMATIC CALL DISTRIBUTOR BY A REMOTELY LOCATED SUPERVISOR

(75) Inventor: Nayel Saleh, Streamwood, IL (US)

(73) Assignee: Rockwell Electronic Commerce Corp., Wood Dale, IL (US)

( * ) Notice: Subject to any disclaimer, the term of this patent is extended or adjusted under 35 U.S.C. 154(b) by 0 days.

(21) Appl. No.: 09/418,178

(22) Filed: Oct. 13, 1999

(51) Int. Cl.[7] .............................................. H04M 3/00
(52) U.S. Cl. .......................... 379/265.03; 379/265.05; 379/265.06
(58) Field of Search ................... 379/265.03, 266.09, 379/309

(56) References Cited

U.S. PATENT DOCUMENTS

| | | | | | |
|---|---|---|---|---|---|
| 5,594,779 A | * | 1/1997 | Goodman | .................. | 455/3.04 |
| 5,784,452 A | * | 7/1998 | Carney | .................. | 379/265.06 |
| 5,790,650 A | * | 8/1998 | Dunn et al. | ............ | 379/265.03 |
| 6,028,917 A | * | 2/2000 | Creamer et al. | ........ | 379/100.01 |
| 6,366,665 B1 | * | 4/2002 | Hymel et al. | ........... | 379/265.03 |

* cited by examiner

Primary Examiner—Harry S. Hong
Assistant Examiner—Karen Le
(74) Attorney, Agent, or Firm—Welsh & Katz, Ltd.

(57) ABSTRACT

A method and apparatus are provided for controlling an automatic call distributor by a supervisor from a remote location. The method includes the steps of establishing a telephonic connection between the supervisor and the automatic call distributor and screening the call for the authorized supervisor. The method further includes the steps of transferring a configuration instruction to the automatic call distributor, executing the configuration instruction by the automatic call distributor and returning a configuration result to the supervisor.

28 Claims, 5 Drawing Sheets

ADMINISTRATION AND CONTROL OF AN AUTOMATIC CALL DISTRIBUTOR BY A REMOTELY LOCATED SUPERVISOR

FIELD OF THE INVENTION

The field of the invention relates to communication systems and more particularly to automatic call distributors.

BACKGROUND OF THE INVENTION

Automatic call distribution systems are known. Such systems are typically used in an organizational context as a means of distributing calls among a group of agents of the organization. Agents are typically segregated into groups to serve particular call targets within an organization.

Automatic call distributors (ACDs) may be used to distribute calls under any of a number of different formats. In a first instance, the term "call" may be used to refer to a request for communication received from (or placed through) a public switched telephone network (PSTN). A call may also refer to a voice path based upon packet data transferred through the Internet using web telephony. Alternatively, a call may be an e-mail or web-site inquiry received through the Internet.

Often the organization disseminates a single telephone number, URL or e-mail address to its customers and to the public in general as a means of contacting the organization. As calls are directed to the organization from the PSTN or Internet, the automatic call distribution system directs the calls to its agents using some assignment algorithm, typically based upon availability. For example, where all agents are considered equal, the ACD may distribute the calls based upon which agent position has been idle the longest.

In order to distribute calls, the ACD system is provided with at least two routing mechanisms for establishing call paths between callers and agents. A first path may be established from the PSTN to a telephone of the agent using a matrix switch of the ACD As an alternative to calls received through the PSTN, a call may also be received through the Internet, as a request for Internet telephony, as e-mail or as an inquiry from a visitor to a website maintained by the organization owning the ACD. While a call received through the Internet may usually lack the immediacy of a call waiting on a switched circuit of the PSTN, it still represents a potential sales opportunity for the organization and must be processed expeditiously.

Accordingly, ACDs may process Internet calls on the same basis as telephone calls. As call arrive, they may be assigned to agents in the same order as they are received. When a backlog exists, Internet calls may be queued in a manner similar to telephone calls. Whereas telephone calls may require the use of a matrix switch to route a call to an agent, an Internet call may be routed simply by transferring a URL or e-mail address of a caller to the terminal of the assigned agent.

As with telephone calls, Internet calls may be routed based upon any of a number of factors. Where a database exists allowing URL or e-mail addresses to be cross-referenced to existing customers, an Internet call may be routed based upon the identity of the caller. Optionally where an Internet call is based upon activation of a specific icon within the website of the organization, routing may be accomplished based upon the detected context of the caller within the website at the instant the icon was activated.

The functionality of an ACD is typically programmed through a supervisor's computer terminal. Agents are identified to the ACD through the supervisors terminal. Call handling routines may be developed and programmed into the ACD through the supervisor's terminal.

As with any computer-based system, ACDs require constant supervision and maintenance. Malfunctions occur, agents must be recruited, work schedules must be developed and enforced. Often supervisors must endeavor to supervise such systems from remote locations by telephone. More specifically, where malfunctions or other problems occur, a supervisor may be required to correct problems and other deficiencies by telephone. Supervision through a telephone is difficult for a supervisor because a technician or some other person must act as a local interface with the equipment (e.g., through the supervisor's terminal) of the ACD. Because of the importance of ACDs, a need exists for a way of allowing a supervisor to directly interact with and control an ACD from a remote location.

SUMMARY

A method and apparatus are provided for controlling an automatic call distributor by a supervisor from a remote location. The method includes the steps of establishing a telephonic connection between the supervisor and the automatic call distributor and screening the call for the authorized supervisor. The method further includes the steps of transferring a configuration instruction to the automatic call distributor, executing the configuration instruction by the automatic call distributor and returning a configuration result to the supervisor.

DETAILED DESCRIPTION OF A PREFERRED EMBODIMENT

Figure 1:
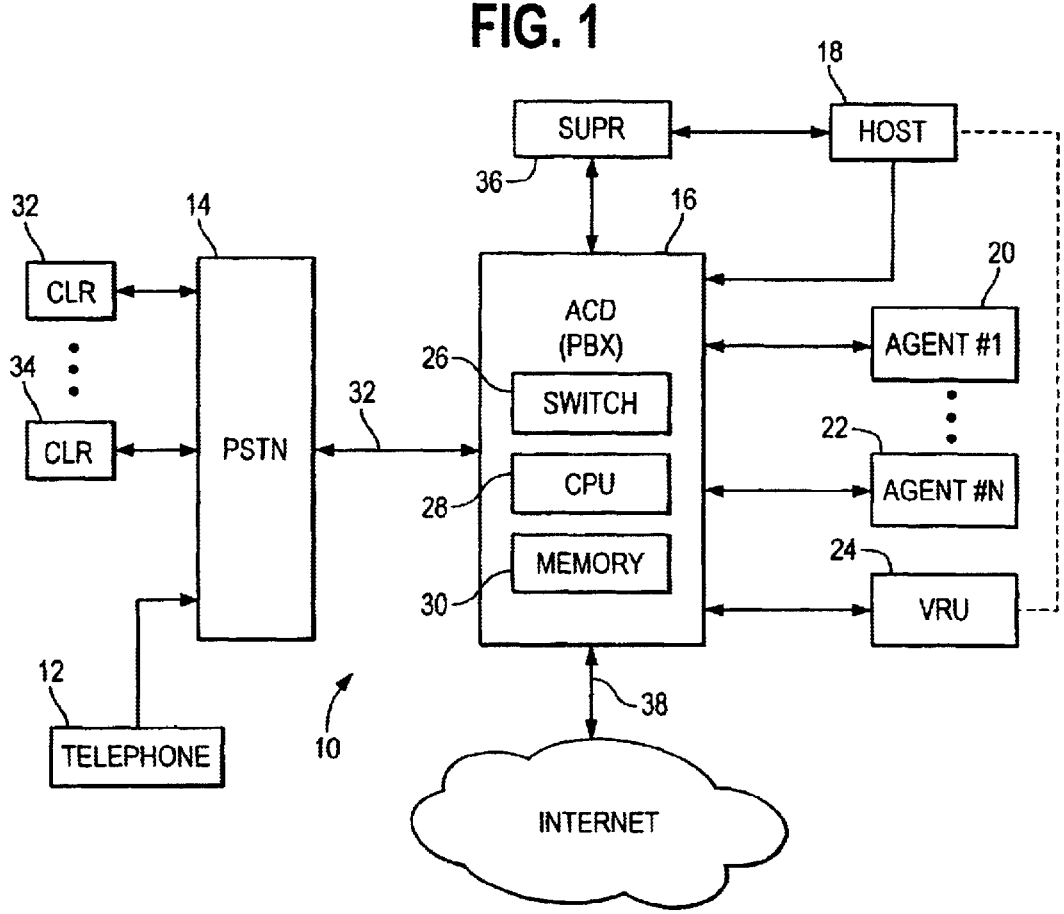
FIG. 1 is a block diagram of an ACD under an illustrated embodiment of the invention.

FIG. 1 is a block diagram of an ACD system 10 in accordance with an illustrated embodiment of the invention. Under the illustrated embodiment, calls may be initiated from either inside or outside the ACD system 10. Calls may be initiated from inside the ACD system 10 based upon one or more URL, e-mail or telephone numbers transferred to the ACD 16 from a host computer 18. Externally initiated calls may come from customers 32, 34 attempting to contact the organization operating the ACD system 10.

In the case of telephone calls initiated from outside the ACD system 10, a public switched telephone network (PSTN) 14 may deliver the calls along with an identifier of the caller. The identifier may be a telephone number of the caller provided by an automatic number identification (ANI) feature operating from within the PSTN 14.

In the case of either incoming or outgoing telephone calls, a call is detected on a trunk connection 32 with the PSTN 14 and routed by a matrix switch 26 within the ACD 16. The matrix switch 26, in turn, may be controlled by a central processing unit (CPU) 28 operating on a set of programming instructions contained in a memory 30.

In the case of Internet calls, a call may be initiated at any of a number of levels. A call may be initiated from outside the organization by e-mail or by the caller visiting a website of the organization. In either case, the ACD 16 receives an identifier of the caller along with the call on an Internet connection 38. When the call is in the form of a e-mail address, the ACD receives a return e-mail address along with the original e-mail message. In the case of a visit to a website of the organization, the caller inherently includes his URL when accessing the website, thereby providing the organization with an Internet address of the website visitor.

As with telephone calls, the organization may maintain a database of e-mail and URL addresses of existing and potential customers. Based upon this database, the ACD 16 may be able to retrieve the identity and interests of Internet callers.

Based upon the database of telephone and Internet callers, the ACD 16 may route calls based upon the identity of the caller, based upon the number dialed by the telephone caller or by the webpage visited by the Internet caller. The telephone number dialed by the caller may be delivered to the ACD 16 along with the call based upon a dialed number identification service (DNIS), also operating within the PSTN 14.

Based upon the programming instructions, the CPU 28 may route calls based upon any number of different criteria. For example, in the simplest case, calls may be routed to agents 20, 22 based upon which agent has been idle the longest. Alternatively, calls may be routed to different agent groups based upon the telephone number called or webpage visited. Calls directed to a particular agent group may be specifically routed to a particular agent within the group because of past experience with the caller.

When all agents in a group are busy with prior calls, a call may be placed in a call queue until an agent becomes available. While in queue a voice response unit (VRU) 24 may be connected to a telephone call in an effort to elicit additional information from the caller. Based upon any additional information elicited from a caller, the call may be processed (i.e., routed) more efficiently.

Telephone call routing accomplished by the switch 26 and Internet call routing is typically based upon routing instructions (call vectors) processed by the CPU 28. Call vectors, in turn, may be developed and controlled by a supervisor working through a supervisor's terminal 36 (hereinafter together sometimes referred to as the "supervisor 36").

In addition to developing and implementing call routing algorithms, a supervisor may also be responsible for day-to-day functions such as hiring and firing agents, creating agent work schedules, developing outgoing call campaigns or troubleshooting equipment problems experienced within the ACD system 10. In order to accomplish the day-to-day functions necessary for the efficient operation of the ACD 16, the supervisor 36 may access one or more utility programs (applications) to accomplish specific tasks. The applications may reside directly within the supervisor's terminal 36, on the CPU 28 of the ACD 16 or with the host 18.

For instance, when an agent is hired or fired, the supervisor 36 may access a first application to add/delete an identifier of the agent from work schedules. In order to schedule agents for a workday, the supervisor may access a second application that facilitates agent scheduling.

Similarly, troubleshooting and call routing may be accessed through third and fourth applications. Call center performance reports and statistics may be accessed through other applications.

Figure 2:
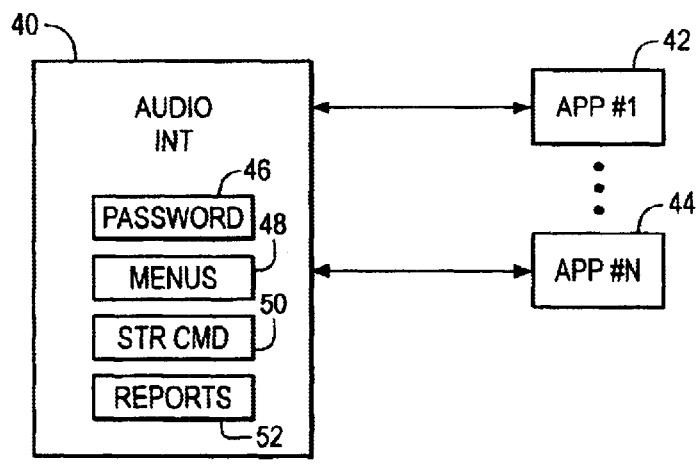
FIG. 2 is a block diagram of a supervisor interface used by the system of FIG. 1.

Under the illustrated embodiment, access to ACD control applications 42, 44 (FIG. 2) may be provided to the supervisor from a remote location through a supervisor interface application 40 residing within the ACD 10. The supervisor interface 40, in turn, may be coupled to the supervisor through the VRU 24. The supervisor interface application 40 may reside on one of the supervisor's terminal 36, host 18 and CPU 28.

To access the supervisor interface 40, the supervisor may call the ACD 10 from any remote location using a telephone 12 connected to the ACD 10 through the PSTN 16. Access to the supervisor interface application may be provided under any of a number of different methods. For example, a specific unlisted telephone number of the ACD 10 may be reserved for supervisor control of the ACD 16 from a remote extension (the unlisted extension number hereinafter sometimes referred to as the "remote access number"). Alternatively, the supervisor may dial a general number of the ACD and be transferred to the remote access number by an agent or operator.

In either case (either by the supervisor dialing in or being transferred by an agent), the ACD 16 is presented with the remote access number. Where the supervisor dials directly inwards, the dialed remote access number is presented to the ACD 16 by DNIS. Where the supervisor is transferred, the ACD 16 receives the remote access number from the transferring agent.

Where the ACD 16 receives the remote access number, the ACD 16 processes the call based upon a set of programming instructions (vectors) provided for handling such calls. For instance, the ACD 16 may instruct the switch 26 to connect the supervisor to the VRU 24. The ACD 16 may also send instructions to the CPU to activate the supervisory interface application 40.

Within the supervisor application 40, a number of routines are provided to perform such operations as screening the calls, presenting menus and accepting supervisor's commands. Once connected to the VRU 24, the supervisory interface application 40 may first screen the call for authorized users. As used herein screening refers to the step of restricting access to the features of remote supervisory control to those callers authorized to have such access.

Screening may be accomplished using any of a number of different methods. For example, a screening application may cause the VRU 24 may present an audible message to the caller asking for a password. In response, the caller may state his name or password. Alternately, the caller may enter digits on the caller's touch-tone telephone in a specific sequence defining the password.

In response, the screening application may compare the entered password against a list of known passwords 46. If a match is found, the caller is granted access as an authorized supervisor. If no match is found the call is disconnected.

Once access has been granted, the VRU 24 may present the caller with a set of menus 48. For example, one menu option may ask the caller if he/she wishes to make configuration or structural changes to the ACD system (e.g., add/delete an agent, reassign agents among groups, adjust overflow thresholds, do a system reset, etc.). Another menu option may ask the caller if he/she wishes to listen to system errors detected within the ACD 16. A third menu option may ask the caller if he/she wishes to listen to system reports.

As used herein a configuration instruction may be any instruction related to a current operational or structural state of the ACD or any information of a statistical nature collected by the ACD regarding operation of the ACD. A structural instruction may be any instruction which relates to a current or proposed structure of the ACD.

Menu selection of instructions may also be accomplished under a variety of different formats. For instance, the menu may explicitly associate a touch-tone button to press for selection of a particular menu option. Alternatively, the supervisor may simply speak certain "key words" of a menu option to make a menu selection.

Under another alternative, menus may not be necessary for a supervisor who is familiar with system options. In this case, the supervisor application 40 simply asks the supervisor if he/she wants a menu. If the supervisor says "no", then the supervisor application may simply say "how may I help you" followed by the supervisor stating the key words of a desired configuration or structural instruction. The supervisor application 40 may, or may not, confirm the command followed by execution of the desired action.

In some cases the desired action may also need an additional parameter in the form of a command limiter. For instance, the structural command "remove agent" may require that the supervisor specify which agent is to be removed. In this case, the supervisor application 40 may simply confirm the command if it is complete or respond "which agent is to be removed" if the command is inherently incomplete.

Where an instruction is determined by the application 40 to be in the proper format, the application 40 functions to access the related application 42, 44 and make the requested changes. For example, where the instruction is to delete an agent, the application 40 functions to access a list of available agents within the ACD 16 and delete the identified agent.

In additional to structural issues, a configuration instruction may relate to status or a performance criteria of the ACD 16. For instance, the supervisor may request information by selecting an agent status (e.g., how many agents are currently taking calls) or a report type (e.g., calls per hour handled by the ACD 16). In the case of agent status, the supervisor application 40 accesses the active agent pool and recovers a number of active agents receiving calls and generates an audible response to the supervisor delineating that number.

In the case where the supervisor selects a report type, the application 40 causes the appropriate report generating application 42, 44 to generate the related report. The supervisor application 40 receives the report and audibly recites the data of the report for the benefit of the supervisor.

Figure 3:
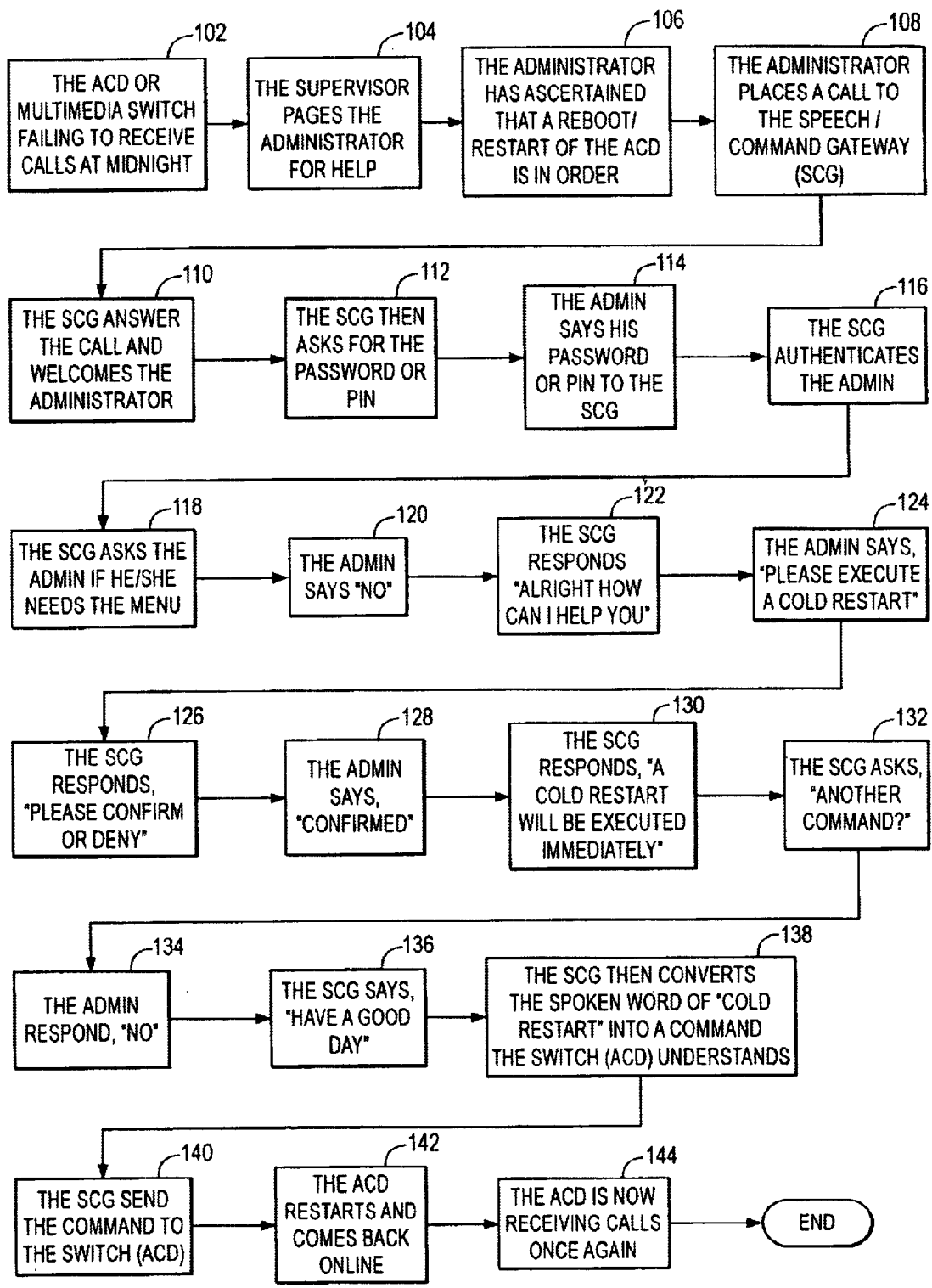
FIG. 3 is an example of a change to an ACD that a remote supervisor may make using the system of FIG. 1.

FIG. 3 is a simplified block diagram 100 of method steps which provide an example of remote supervisor access in the case where the supervisory action requires a reboot of the ACD 16. It should be noted for purposes of this example, that the remotely located supervisor is referred to in the block diagram as an administrator.

As shown, an ACD fault appears (e.g., the ACD fails to receive calls 102) and a local supervisor calls the remotely located supervisor 104. The remotely located supervisor determines 106 that the ACD 16 must be restarted and places a call 108 using the remote access number. The supervisor audio interface 40 answers the call 110 through the VRU 24 and requests 112 a password.

The supervisor responds with a password 114 and the interface 40 confirms 116 the password. The interface 40 asks the supervisor if he/she needs a menu 118 to which the supervisor may respond 120 with the answer "no". The interface 40 then proceeds to solicit a command 122. The supervisor, in turn, states "please execute a cold restart" 124 to which the interface 40 asks for a confirmation 126. The supervisor confirms his request 128 and the interface 40 states that the instruction will be executed 130.

Once the interface 40 confirms the instruction, the interface 40 may ask if any other instructions are forthcoming 132. If the supervisor says "no" 134, then the interface terminates the call 136 and formulates a cold start request 138. The instruction is sent 140 to the CPU 28, the CPU 28 performs a cold restart 142 and comes back on-line 144.

Figure 4:
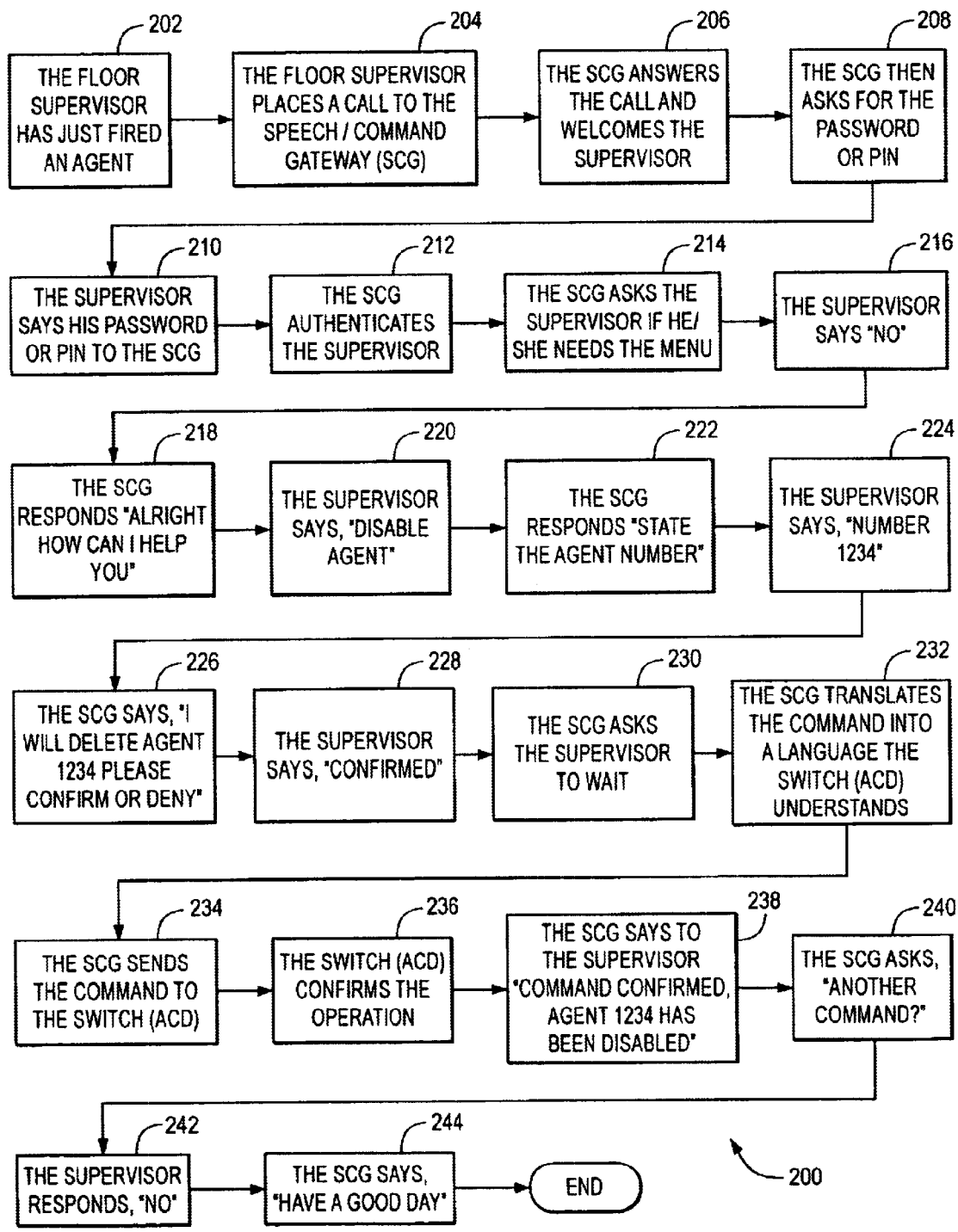
FIG. 4 is an alternate example of a change to an ACD that a remote supervisor may make using the system of FIG. 1.

In another example (FIG. 4), a supervisor may execute the structural command of deleting an agent. FIG. 4 depicts a flow chart 200 providing a set of exemplary steps that may be associated with deletion of an agent from the ACD 16. As shown, once the supervisor terminates 202 the agent, the supervisor may place a call 204 to the interface 40. The interface 40 answers the call 206 and asks for a password 208.

The supervisor provides a password 210. In response, the interface 40 compares the password to a list 46 within the interface 40. If the password is not present, the interface terminates the call. If a match is found the interface authenticates the call 212 as being from an authorized user.

Once the call is authenticated, the interface 40 inquires whether the caller needs a menu 214. If the caller says "no" 216, the interface responds that it is ready 218 to receive a verbal command 220.

In response to the command "disable agent", the interface 40 recognizes the command as being incomplete and asks 222 for an agent number. The supervisor states the agent number 224 and the interface 40 requests confirmation of the command 226.

If the supervisor confirms the command 228, the interface asks the supervisor to wait 230 while the interface 40 accesses the proper applications 42, 44 to converts the command into a format which the CPU 28 can execute 232. The converted command is sent 234 to the CPU 28 and the CPU 28 confirms 236 execution of the change.

Once the interface 40 has received confirmation from the CPU 28, it confirms deletion of the agent to the supervisor 238. The interface 40 then queries the supervisor for another command 240. If the supervisor says "no" 242, the interface terminates 244 the connection.

Figure 5A:
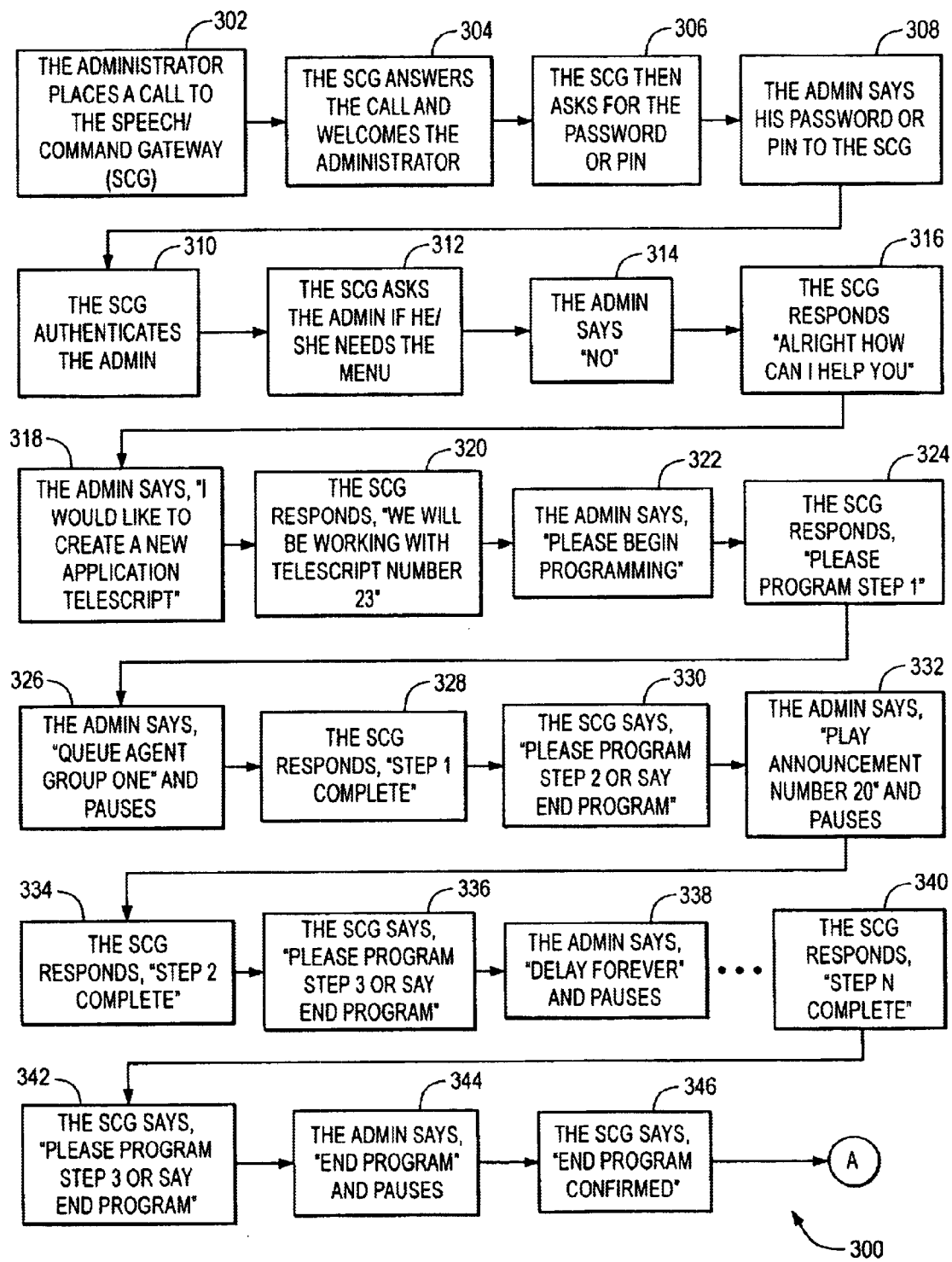
FIGS. 5a–b is an example of a programming change to an ACD that a remote supervisor may make using the system of FIG. 1.
Figure 5B:
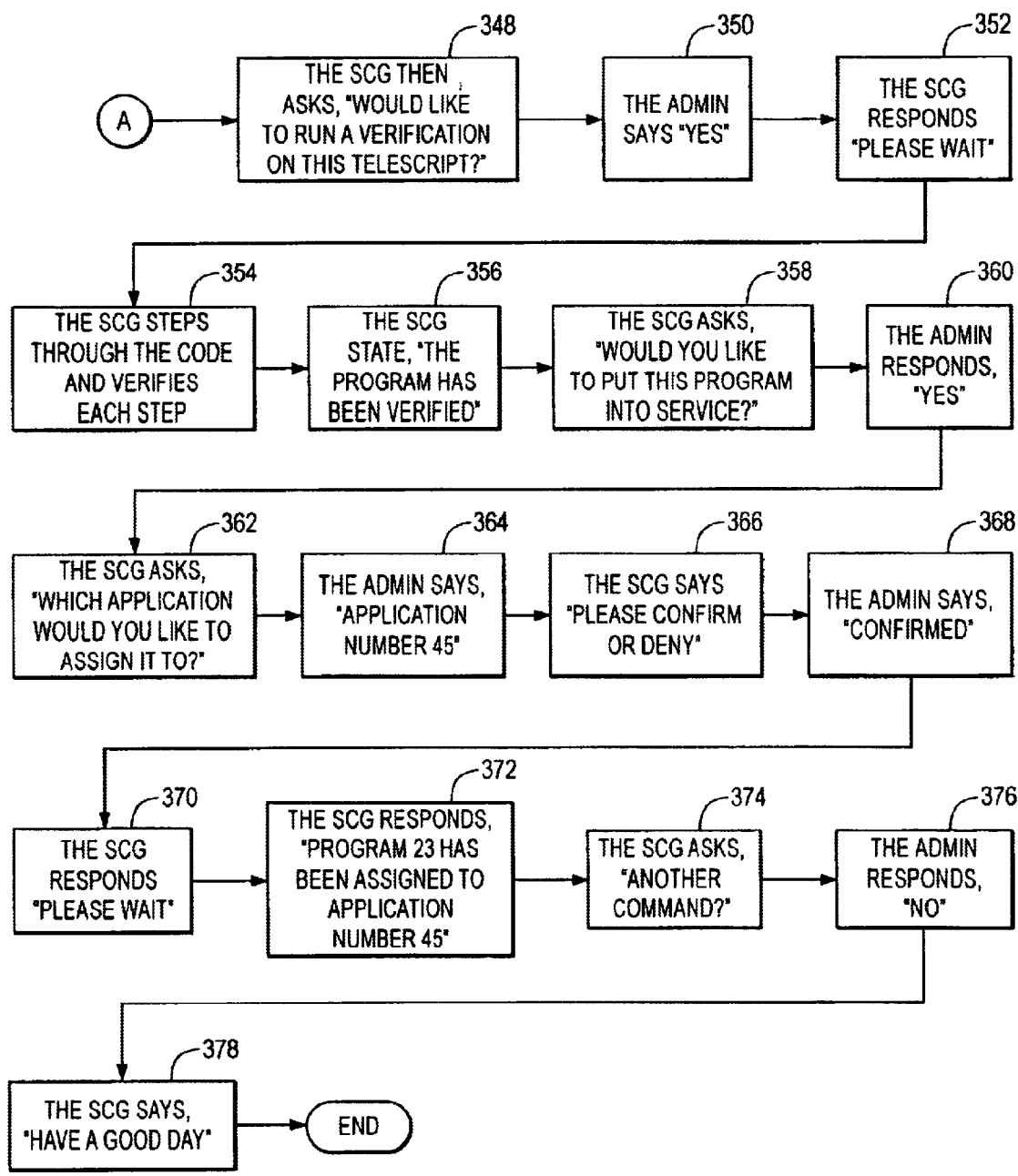

In a next example (FIG. 5), the interface 40 may be used to change the call handling structure of the ACD 16. The interface 40 may be used in this regard to allow a remotely located supervisor to create or modify call vectors for call processing. While the example of FIG. 5 is directed generally to a program for generating an application for a new sales campaign, it should be understood that the concepts of FIG. 5 may be applied to any new program or modification of any existing call routing application.

To this end, the supervisor places a call 302 to the interface 40. The interface answers 304 and asks for a password 306. The supervisor states his password 308 and the interface 40 authenticates the password 310.

Following screening, the interface asks the user if he/she needs a menu 312. If the user says "no" 314, the interface prepares itself to accept instructions and informs the user when it is ready to accept instructions 316.

If the supervisor states that he would like to create a new application telescript 318, the interface 40 recognizes the instruction as a prelude to creation of a call handling telescript and prepares itself by assigning a number 320 to the telescript to be created.

The supervisor may then instruct the interface 40 to begin programming 322, to which the interface responds that it is ready to accept step #1 324.

The supervisor may then enter a first programming instruction 326 (e.g., "queue agent group one"). In response, the interface converts the verbal instruction into the proper format and informs the supervisor when it is done 328. Once the first programming step is complete, the interface 40 prompts the supervisor to enter the next step or end the program 330.

Upon completion of the first programming step, the supervisor may enter the second programming step 332 (e.g., "play announcement number 20"). Again, the interface converts the verbal instruction into the proper format, informs the supervisor when it is complete 334 and prompts the supervisor to enter the next step or end the program 336.

The process of entering program steps may be continued to virtually any level as shown by the dots between steps 338 and 340. At each level, the supervisor enters a program step, the interface 40 converts the step into the proper format and prompts the supervisor for the next step.

At some point the supervisor may complete the call handling telescript and in response to a prompt 342, the supervisor will enter instruction "end program" 344. In response, the interface 40 ends the program entry phase and informs the supervisor with an appropriate statement 346.

Upon completion of the program entry phase, the interface 40 may ask the supervisor if he/she would like to verify the program 348. If the supervisor says "yes" 350, the interface 40 retrieves the formatted program steps 352 and recites the steps one at a time 354 for the benefit of the supervisor. The interface 40 informs the supervisor when the end of the entered program has been reached 356 and asks the supervisor if he/she would like to put the program into service 358.

If the supervisor says "yes" 360, the interface 40 asks the supervisor for the number of a call processing application to which it should be assigned 362. The supervisor may respond with a number "N" 364 and the interface 40 may ask that the number N be verified 366. If the number conforms to an existing application, the interface 40 may confirm 368 the assignment. After a period necessary to compile the new program 370, the interface 40 informs the supervisor when the program has been activated 372 and asks the supervisor if he/she wishes to make further changes 374. If the answer is "no" 376, the interface 40 terminates the connection 378.

A specific embodiment of a method and apparatus for allowing remote control of an automatic call distributor by a supervisor has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

What is claimed is:

1. A method of controlling an automatic call distributor by a supervisor authorized to control the automatic call distributor from a remote location, such method comprising the steps of:

establishing a telephonic connection between the remotely located supervisor and the automatic call distributor;

screening the call for the authorized supervisor;

asking the remotely located supervisor whether he/she needs an optional menu;

recognizing a response from the remotely located supervisor accepting or rejecting the optional menu;

transferring a configuration instruction from the supervisor to the automatic call distributor;

executing the configuration instruction, by the automatic call distributor; and returning a configuration result to the supervisor.

2. The method of controlling an automatic call distributor as in claim 1 wherein the step of establishing a connection further comprises dialing a telephone number by the supervisor of a remote access extension of the automatic call distributor.

3. The method of controlling an automatic call distributor as in claim 2 wherein the step of dialing the remote access extension further comprises answering the call by the automatic call distributor and coupling a voice response unit to the answered call.

4. The method of controlling an automatic call distributor as in claim 3 wherein the step of coupling a voice response unit to the call further comprises prompting the supervisor for a personal identification number.

5. The method of controlling an automatic call distributor as in claim 4 further comprising comparing an entered personal identification number with a list of authorized supervisory users.

6. The method of controlling an automatic call distributor as in claim 5 wherein the step of transferring a configuration instruction to the automatic call distributor further comprising verbally receiving a structural command regarding operation of the automatic call distributor from the supervisor by the voice response unit.

7. The method of controlling an automatic call distributor as in claim 5 wherein the step of verbally receiving a structural command further comprises receiving a program change.

8. The method of controlling an automatic call distributor as in claim 6 wherein the step of transferring a configuration instruction to the automatic call distributor further comprises presenting the supervisor with a menu of supported structural commands regarding to operation of the automatic call distributor.

9. The method of controlling an automatic call distributor as in claim 8 further comprising selecting command from the menu of supported structural commands.

10. The method of controlling an automatic call distributor as in claim 9 wherein the step of selecting a command from the menu of supported structural commands further comprises requesting a parameter from the supervisor limiting the selected structural command.

11. The method of controlling an automatic call distributor as in claim 10 wherein the step of requesting a parameter from the supervisor limiting the selected structural command further comprises entering an agent identifier.

12. The method of controlling an automatic call distributor as in claim 11 wherein the step of requesting a parameter from the supervisor limiting the selected structural command further comprises entering an ACD performance criteria.

13. Apparatus for controlling an automatic call distributor by a supervisor authorized to control the automatic call distributor from a remote location, such apparatus comprising:

means for establishing a telephonic connection between the remotely located supervisor and the automatic call distributor;

means for screening the call for the authorized supervisor;

means for transferring a programming step to create or modify a call handling telescript for call processing from the supervisor to the automatic call distributor;

means for entering the programming step into the call handling telescript by the automatic call distributor; and means for returning a configuration result to the supervisor.

14. The apparatus for controlling an automatic call distributor as in claim 13 wherein the means for establishing a connection further comprises means for dialing a telephone number by the supervisor of a remote access extension of the automatic call distributor.

15. The apparatus for controlling an automatic call distributor as in claim 14 wherein the means for dialing the remote access extension further comprises means for answering the call by the automatic call distributor and coupling a voice response unit to the answered call.

16. The apparatus for controlling an automatic call distributor as in claim 15 wherein the means for coupling a voice response unit to the call further comprises means for prompting the supervisor for a personal identification number.

17. The apparatus for controlling an automatic call distributor as in claim 16 further comprising means for comparing an entered personal identification number with a list of authorized supervisory users.

18. The apparatus for controlling an automatic call distributor as in claim 15 wherein the means for transferring a configuration instruction to the automatic call distributor further comprises means for verbally receiving a structural command regarding operation of the automatic call distributor from the supervisor by the voice response unit.

19. The apparatus for controlling an automatic call distributor as in claim 18 wherein the means for verbally receiving a structural command further comprises means for receiving a program change.

20. The apparatus for controlling an automatic call distributor as in claim 18 wherein the means for transferring a configuration instruction to the automatic call distributor further comprises means for presenting the supervisor with a menu of supported structural commands regarding operation of the automatic call distributor.

21. The apparatus for controlling an automatic call distributor as in claim 20 further comprising means for selecting a command from the menu of supported structural commands.

22. The apparatus for controlling an automatic call distributor as in claim 21 wherein the means for selecting a command from the menu of supported structural commands further comprises means for requesting a parameter from the supervisor limiting the selected structural command.

23. The apparatus for controlling an automatic call distributor as in claim 22 wherein the means for requesting a parameter from the supervisor limiting the selected structural command further comprises means for entering an agent identifier.

24. The apparatus for controlling an automatic call distributor as in claim 23 wherein the means for requesting a parameter from the supervisor limiting the selected structural command further comprises means for entering an ACD performance criteria.

25. Apparatus for controlling an automatic call distributor by a supervisor authorized to control the automatic call distributor from a remote location, such apparatus comprising:

a remotely located telephone adapted to establish a telephonic connection between the remotely located supervisor and the automatic call distributor;

a screening processor adapted to screen the call for the authorized supervisor;

a voice response unit adapted to recognize a programming step to create or modify a call handling telescript for call processing spoken by the supervisor;

a supervisor interface application adapted to enter the transferred programming step into the call handling telescript; and a voice synthesizer within the voice response unit adapted to return a configuration result to the supervisor.

26. The apparatus for controlling an automatic call distributor as in claim 25 wherein the voice synthesizer further comprises a set of menu options adapted to prompt the supervisor for a personal identification number.

27. The apparatus for controlling an automatic call distributor as in claim 26 further comprising a password comparator adapted to compare an entered personal identification number with a list of authorized supervisory users.

28. The apparatus for controlling an automatic call distributor as in claim 25 wherein the voice response unit further comprises a voice analyzer adapted to verbally receive a structural command regarding operation of the automatic call distributor from the supervisor by the voice response unit.

* * * * *